(12) United States Patent
Wang et al.

(10) Patent No.: US 8,433,138 B2
(45) Date of Patent: Apr. 30, 2013

(54) INTERACTION USING TOUCH AND NON-TOUCH GESTURES

(75) Inventors: Hao Wang, Beijing (CN); Xiujuan Chai, Beijing (CN); Kun Yu, Beijing (CN)

(73) Assignee: Nokia Corporation (FI)

( * ) Notice: Subject to any disclaimer, the term of this patent is extended or adjusted under 35 U.S.C. 154(b) by 1173 days.

(21) Appl. No.: 12/260,295

(22) Filed: Oct. 29, 2008

(65) Prior Publication Data

US 2010/0104134 A1 Apr. 29, 2010

(51) Int. Cl.
*G06K 9/00* (2006.01)
(52) U.S. Cl.
USPC .......... 382/181; 345/156; 345/173; 382/103; 382/203
(58) Field of Classification Search .................. 345/156, 345/173; 382/103, 181
See application file for complete search history.

(56) References Cited

U.S. PATENT DOCUMENTS

| | | | | |
|---|---|---|---|---|
| 6,930,672 B1 * | 8/2005 | Kuribayashi | | 345/173 |
| 7,030,861 B1 * | 4/2006 | Westerman et al. | | 345/173 |
| 7,411,575 B2 * | 8/2008 | Hill et al. | | 345/156 |
| 7,519,223 B2 * | 4/2009 | Dehlin et al. | | 382/203 |
| 7,593,000 B1 * | 9/2009 | Chin | | 345/156 |
| 7,643,006 B2 * | 1/2010 | Hill et al. | | 345/156 |
| 2006/0044282 A1 * | 3/2006 | Pinhanez et al. | | 345/173 |
| 2006/0098873 A1 * | 5/2006 | Hildreth et al. | | 382/181 |
| 2009/0178011 A1 * | 7/2009 | Ording et al. | | 715/863 |
| 2009/0316952 A1 * | 12/2009 | Ferren et al. | | 382/103 |
| 2010/0020025 A1 * | 1/2010 | Lemort et al. | | 345/173 |
| 2010/0104134 A1 * | 4/2010 | Wang et al. | | 382/103 |
| 2012/0013529 A1 * | 1/2012 | McGibney et al. | | 345/156 |

OTHER PUBLICATIONS

Commonly-owned, co-pending case U.S. Appl. No. 12/147,643, filed Jun. 27, 2008.
Evan M. Clark, "A Multicamera System for Gesture Tracking With Three Dimensional Hand Pose Estimation", Rochester Institute of Technology, Rochester, New York, May 2006.

\* cited by examiner

*Primary Examiner* — Gregory M Desire
(74) *Attorney, Agent, or Firm* — Banner & Witcoff, Ltd.

(57) ABSTRACT

A computer interface may use touch- and non-touch-based gesture detection systems to detect touch and non-touch gestures on a computing device. The systems may each capture an image, and interpret the image as corresponding to a predetermined gesture. The systems may also generate similarity values to indicate the strength of a match between a captured image and corresponding gesture, and the system may combine gesture identifications from both touch- and non-touch-based gesture identification systems to ultimately determine the gesture. A threshold comparison algorithm may be used to apply different thresholds for different gesture detection systems and gesture types.

29 Claims, 7 Drawing Sheets

INTERACTION USING TOUCH AND NON-TOUCH GESTURES

FIELD OF ART

The features described herein generally relate to techniques for optimizing user interaction with a computing device using gestures.

BACKGROUND

Man-machine interfaces have been around since the earliest machines. For early computers, the interface involved a display monitor (e.g., a cathode ray tube—CRT) for providing information to the user, and a textual keyboard for the user to provide input to the computer. Over the years, changes and improvements have been made to simplify this interface. The mouse input device and graphical user interface have made computers much more easy to use, and have become ubiquitous among computers.

Another type of input device has been the electromagnetic tablet, which included a flat surface, under which was an array of antennas that could detect the presence of an electromagnetic pen. As a further improvement on those early tablets, modern tablets have incorporated a display with the tablet's flat surface, so that the computer's display monitor can detect the presence of an electromagnetic pen. Even further improvements have done away with the requirement for the electromagnetic pen, and have become sensitive to the touch of any physical object, such as the user's finger.

All of these advancements and improvements illustrate the general need for simplifying computer-user interfaces, to make computing even easier than before.

SUMMARY

This summary is not intended to identify critical or essential features of the inventions claimed herein, but instead merely summarizes certain features and variations thereof.

A computer interface system may use both touch gestures and non-touch gestures, and may include different gesture detection systems optimized for detecting touch and non-touch gestures. The system may allow these different gesture detection systems to view or otherwise detect a user's gesture and interpret it as an identified gesture. The detection systems may also generate similarity values indicating the relative strengths of the match between their captured images and a predefined template for the identified gesture, and compare these values with predetermined thresholds to arrive at the gesture identification.

In some embodiments, the similarity values for both systems may be compared against thresholds, which may also vary depending on system type, gesture type, context, and other factors, to combine touch and non-touch detection results and ultimately select an inputted gesture.

The touch-based gesture detection system and non-touch based gesture detection system need not be limited to a particular type of gesture. For example, the touch-based gesture detection system may also attempt to detect non-touch gestures, and vice versa.

The combining process may account for relative weightings of the detection systems' gesture identification, and may use a differential threshold to determine which system's gesture identification should be adopted.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
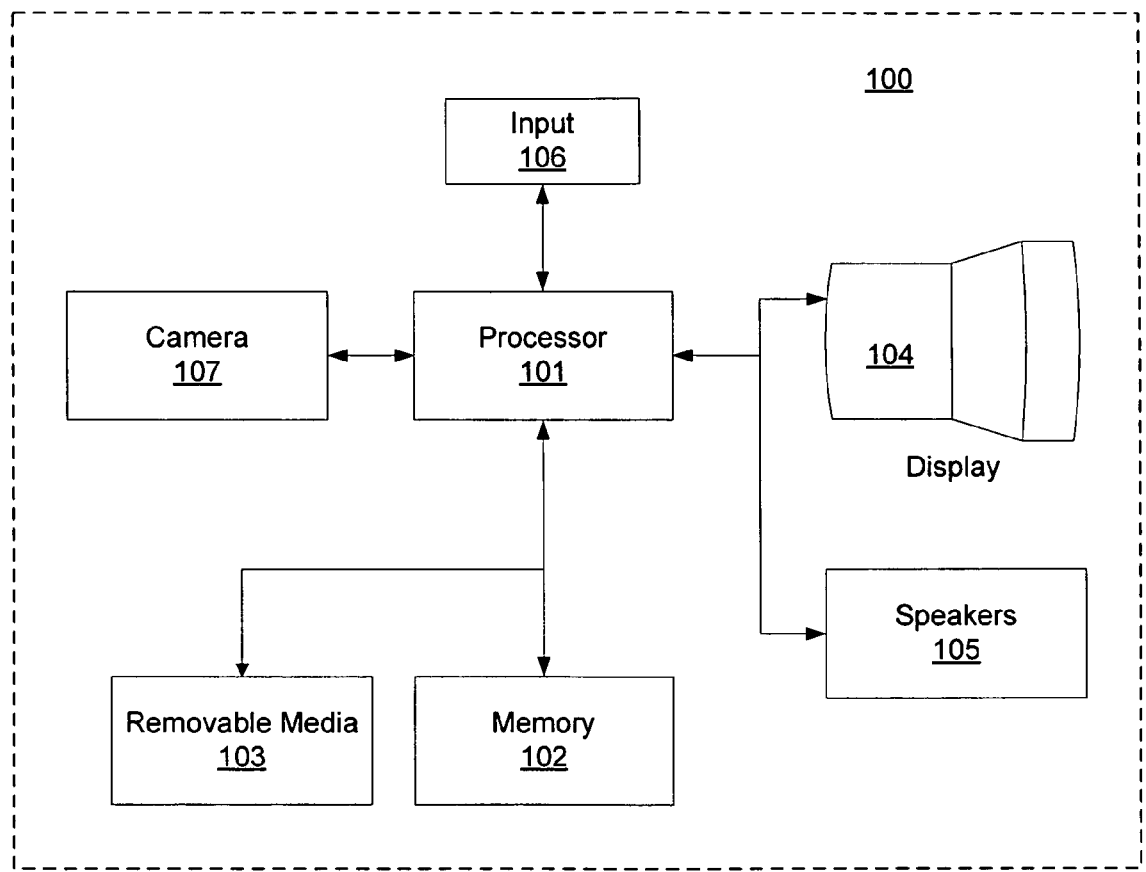
FIG. 1 illustrates an example of a basic computing system on which the features herein may be implemented.

FIG. 1 illustrates, in one aspect described herein, basic components of an example computing system on which features described herein may be implemented. The system 100 may take the form of a general purpose computer, such as a personal computer. System 100 may be implemented as any other fixed or mobile electronic device, such as a mobile cellular telephone, mobile communication device, personal data assistant (PDA), pager, TV device, music player, AM/FM/digital radio receiver, video player, camera, etc.

The system 100 may have one or more processors 101, such as a programmable logic device or multi-purpose microprocessor, that may execute computer-executable instructions to provide features described herein. The instructions may be stored as computer-readable instructions on one or more computer-readable media, such as memory devices 102, which may be dynamic and/or static random access memories (RAM), read-only memories (ROM), magnetic or optical disk, or any other desired computer-readable storage device. The system 100 may also include one or more removable media 103 that can also store any of the data described herein (e.g., computer-readable instructions, data described below, etc.). The removable media 103 may be any desired type, such as removable FLASH memory, disk drives, optical or magnetic disks, etc.

[21] The system 100 may include one or more output devices to provide information and feedback to the user. The output devices may include video output devices, such as a display 104, which can display menu choices, interactive displays, video, or any other visible information to the user. The output devices may also include one or more speakers 105, which can be used to play audio for the user.

The system 100 may also include one or more user input devices 106. The user input devices 106 may be, for example, alphanumeric push buttons on a keyboard (e.g., desktop computer keyboard, mobile telephone keypad, etc.), touch and/or capacitive-sensitive pads on a laptop, computer mouse, trackball, stylus on a sensitive input area or display, etc. As will be described below, the system may use one or more cameras 107 to provide visual input to the processor. The system 100 is illustrated as an integral system, but may be separated into various distinct components as desired.

Figure 2:
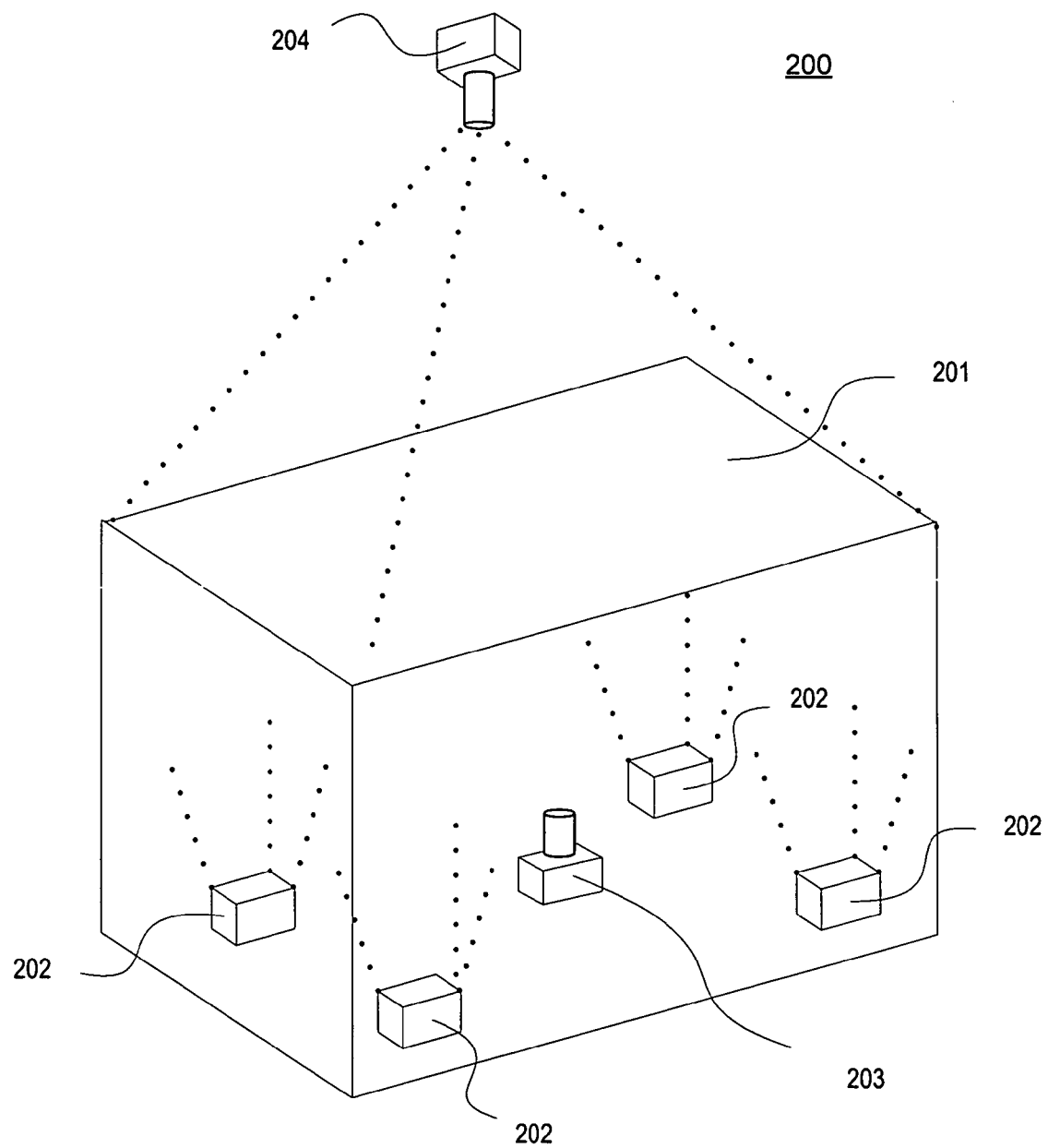
FIG. 2 illustrates an example gesture input system usable with the computing system of FIG. 1.

FIG. 2 illustrates an example gesture detection system 200 that may be used with the computing system 100. The gesture detection system 200 may include a horizontal display screen 201, which may serve as display 104 to display graphical images to be seen by the user, as well as input 106 to receive input from the user (as will be described below). The screen 201 may be composed of a clear panel, such as glass or acrylic, to allow an image to be displayed via projection from below.

The system 200 may be configured to detect different types of input, such as touch-based inputs and non-touch-based inputs. Touch-based inputs may include placing an object, such as a user's finger, on the screen 201. Non-touch-based inputs may include gestures made above the screen 201, such as moving a user's hand over the system screen 201. The systems for detecting these gestures may involve a series of cameras. For touch-based gestures, the system 200 may include a touch-based gesture detection system, having a series of light emitters 202 (which may be infrared) and camera 203. Light from the emitters 202 may illuminate, and pass through, the underside of screen 201.

When an object, such as the user's finger, is placed on top of the screen 201 from above, the object will reflect the light from emitters 202. That reflected light may be detected by one or more cameras 203. Images detected from camera 203 may be supplied to processor 101 for processing to determine where the screen 201 has been touched. Some touch-based gestures may incorporate movement (e.g., swiping a finger across a portion of screen 201 in a predetermined pattern), and in those cases the images from camera 203 may be sequential in time. FIG. 4, discussed further below, provides an example process by which such gestures may be detected.

For non-touch-based gestures, the system may include a non-touch based gesture detection system, having a second camera 204, positioned above the top of screen 201. The second camera 204 may be a more traditional, visible light camera. Images captured from camera 204 may also be supplied to processor 101 for processing to determine where gestures were made above the screen 201, and what types of gestures were made.

Although the two cameras 203, 204 are described above as being useful for touch and non-touch gestures, respectively, they are each useful for both gesture types. In other words, the infrared camera 203 may also be used to detect non-touch gestures that occur near the screen 201 and are visible. Similarly, the visible light camera 204 may also detect touch gestures, for example, by determining whether the user's hand appears to be touching the screen 201. In some embodiments herein, the combination of these two input detection approaches helps provide an effective input gesture detection mechanism.

Figure 3:
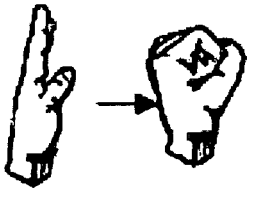
FIG. 3 illustrates examples of non-touch and touch gestures that may be detected using the systems shown in FIGS. 1 and 2.

FIG. 3 illustrates examples of touch and non-touch gestures that may be made with a user's hand. For example, non-touch gestures may involve finger configurations (such as the "Start" and "End" configurations illustrated) and/or movements (such as the "Grasping" and "Dropping" movements illustrated). Touch gestures may involve an object making contact with the screen 201, such as one or more fingers pressing on the screen 201 at a location (or in a predetermined pattern), or a hand pressing on the screen 201. Touch gestures may also involve movements across the screen 201, such as a finger mopping motion of dragging the finger. In some embodiments described herein, touch and non-touch gestures can be combined, and used together to provide predetermined commands to the computing system.

Figure 4A:
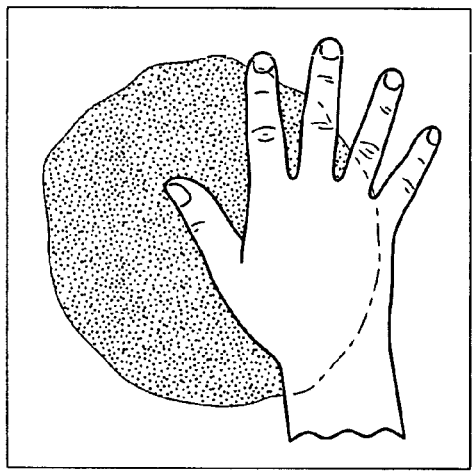
FIGS. 4a and 4b illustrate an example application that combines touch and non-touch gestures.
Figure 4B:
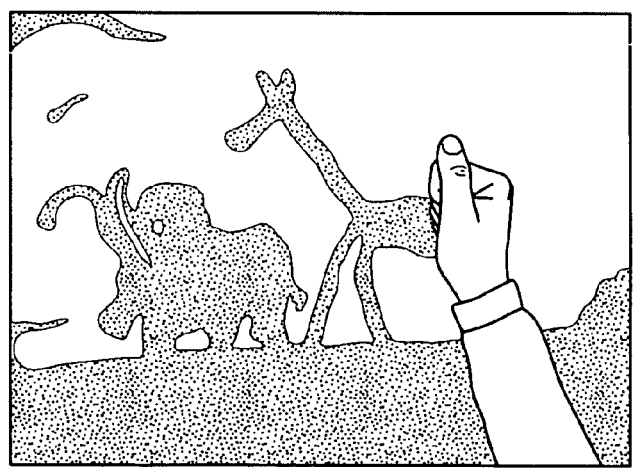

FIGS. 4a and 4b illustrate an example application that can combine touch and non-touch gestures. The example application mimics the behavior of sand on the screen 201. In FIG. 4a, the user may make a closed-first gesture above the screen 201 (signaling to the application that the first is holding sand), and the user may then open the hand to mimic dropping sand on the screen 201. The computing system 100 may detect this gesture, and may display an image of a pile of sand under the user's hand. Then, the user may touch the screen 201 to clear away sand at the location of the touch; swipe/mop a finger across the surface to clear away patterns of sand; pick up sand from the screen 201 (e.g., a hand pressing touch gesture followed by a first); and/or drop sand on the screen 201, to create patterns and images in the sand, as illustrated in FIG. 4b.

Figure 5:
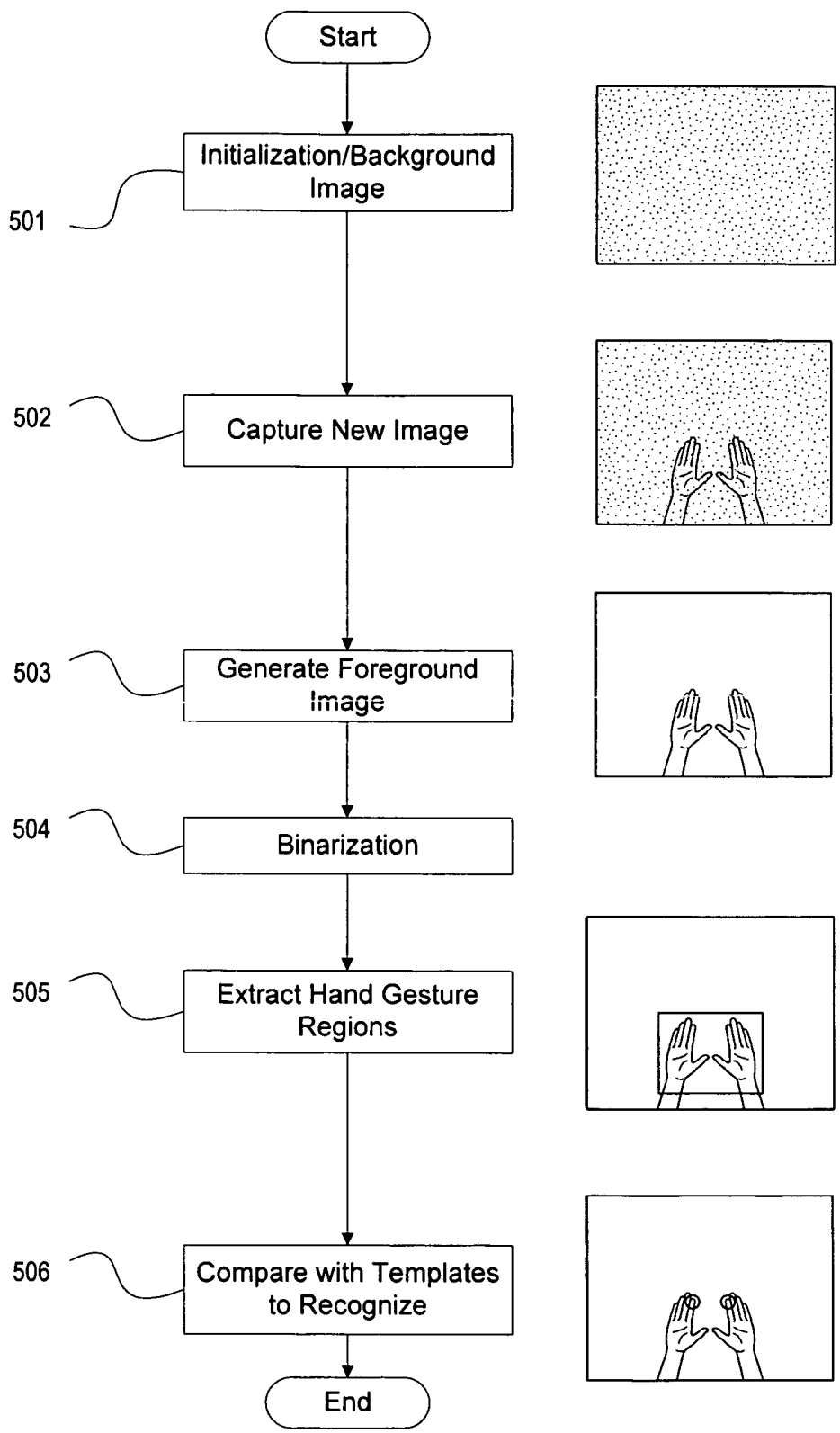
FIG. 5 illustrates an example process of detecting a touch gesture.

FIG. 5 illustrates an example process by which a touch gesture may be detected using camera 203. Steps in the process are shown on the left, and corresponding example images from camera 203 are shown on the right, to help illustrate the process. First, in step 501, the camera 203 may be initialized to capture a background image in which no objects are placed on the screen 201. Once the system has been initialized, it is ready to begin detecting touch gestures. In step 502, the camera 203 may capture a new image or sequence of images, and in step 503, the background image may be subtracted from the new image to yield a foreground image of the object (s) that were not present in the background during initialization. This subtraction may be performed using any desired image processing method.

In step 504, the foreground image may be binarized to identify, on a per-pixel basis, whether an object is, or is not, present at that pixel. For example, the binarization may generate a binary (e.g., black and white) version of the foreground image, by comparing color or brightness values of a pixel with a predetermined threshold value, so that pixels having values above the threshold are indicated as white, and pixels having values below the threshold are indicated as black (or vice-versa).

In step 505, the binarized foreground image may then be examined to isolate the region in which an object appears. In the example shown in FIG. 5, the lower portion of the image shows the user's two hands, so this gesture region is extracted in step 505 (the gesture region is highlighted for explanation by a surrounding box in FIG. 5). Any desired image process can be used to extract this region. For example, a connected-component method may be used, in which the brightest part of the image (e.g., the strongest point of actual contact) is first selected, and then nearby pixels having a similar brightness (or having a brightness that is within a predetermined threshold of the first point) are added, and the process continues, spreading to nearby pixels until there is a sufficient dropoff in image brightness between neighboring pixels. This method may define regions, such as the highlighted rectangular region illustrated beside step 505.

When the gesture region has been identified, the image in that region may be compared in step 506 with predetermined templates to determine whether a gesture has been detected. This comparison may be performed using any desired image matching algorithm. For motion-based gestures, the template may comprise a series of predefined gesture images through the motion, and the steps above may be repeated to account for the various portions of the motion. Alternatively, a sequence of a plurality of images may be captured prior to comparison with a multi-image template.

If a match is found between a template and the gesture region of the image, the process may provide an output indicating that a gesture was detected, and identifying the detected gesture. The output can also include information identifying how closely the detected gesture matched the template for the gesture. For example, if the template indicates that a given gesture requires two of the user's fingers to form a horizontal line, and the detected fingers form a line that is not quite horizontal, then the output from step 506 may include an indication that the detected gesture was not a perfect match. For example, the system may generate a similarity value ($S_T$) indicating how similar the detected gesture actually was to the gesture's template. Each template may define threshold values and/or ranges for determining similarity. For example, the template for the two-finger line example may indicate that a horizontal line has a perfect similarity value of 1.0; a line askew by less than 10 degrees may have a similarity value of 0.8; and a line askew by 11 to 20 degrees may have a similarity value of 0.5. The output can be data written to memory, a control signal to another application or device, viewable results of a command executed in response to the gesture (e.g., displaying a message confirming the command was executed, a prompt associated with the command, etc.), or any other desired form.

If no match is found in step 506 between a template and the gesture region of the image, the process may provide an output indicating this fact. Then, the process may conclude, or it may return to step 502 to capture and process another image.

The discussion of FIG. 5 is in the context of touch-based gestures, but the same or a similar process may be used for non-touch gestures using camera 203. For example, non-touch gestures made near the screen 201 may still reflect enough infrared light to be detected by camera 203.

Additionally, camera 204 may also be used in a similar manner to capture images from above screen 201, and to determine whether a touch or non-touch gesture has been performed. For example, camera 204 may provide sequential frames of images, and the system 100 may analyze the frames to separate out the user's hands from a background image, to recognize the positioning of the hands, and to compare them with predetermined templates of known gestures to identify a gesture made above or on the screen 201. A given gesture's template may also include template information for the camera 204. For example, the template for a hand press gesture may include a standard image, from above screen 201, showing a generic hand touching the screen 201 in a hand pressing gesture. The detected image from camera 204 may be compared against this standard image to determine whether it appears, from camera 204's point of view, that a hand press gesture was made, and the system may generate a similarity value ($S_H$) indicating the strength of this identification.

Figure 6:
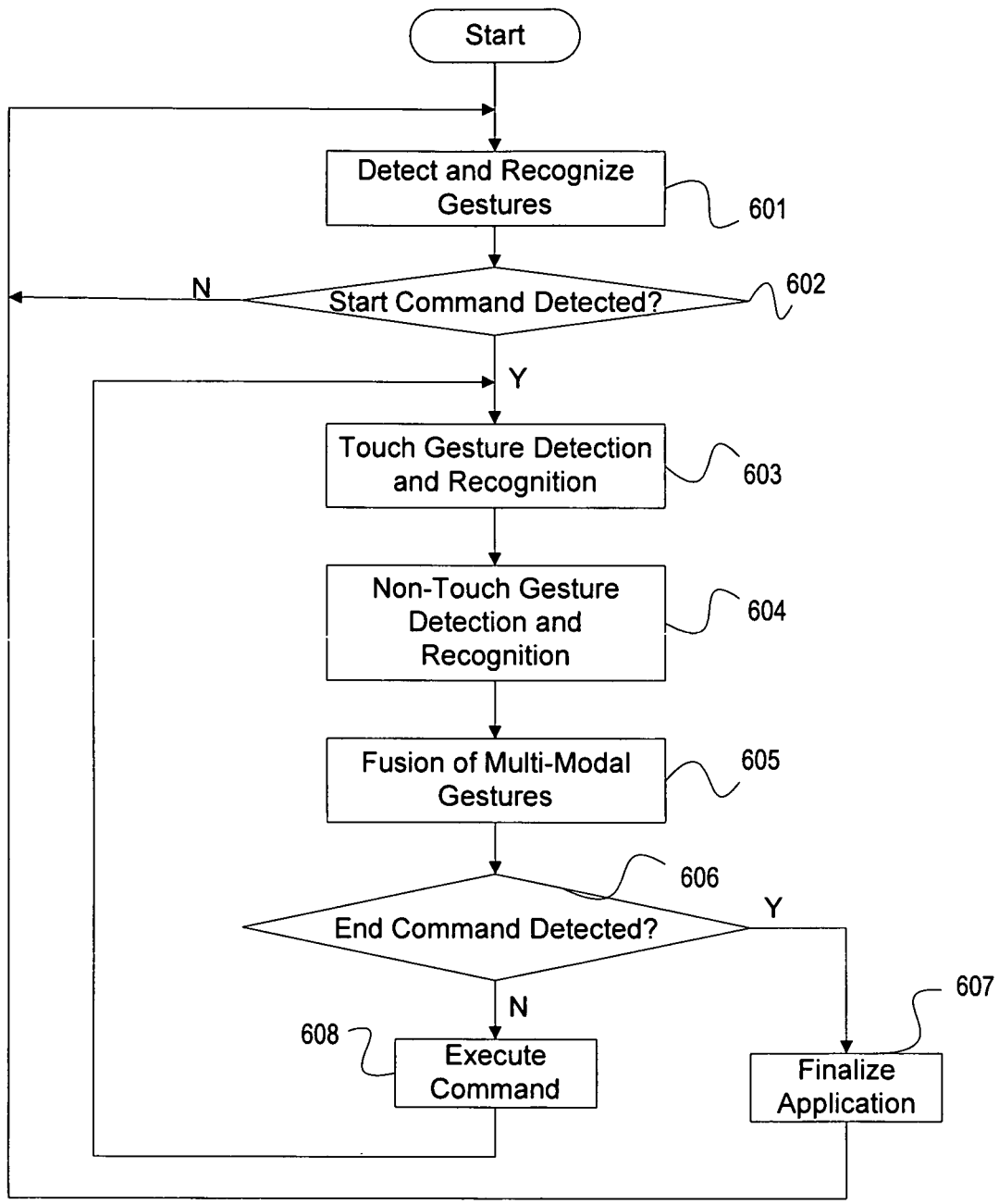
FIG. 6 illustrates an example process allowing use of touch and non-touch gestures.

FIG. 6 illustrates an example process for an application that uses both touch and non-touch gesture detection systems for user input. This may be, for example, the sand simulation described above. In this process, the two cameras 203, 204 may each provide their own determination of whether a given touch or non-touch gesture has been detected.

In step 601, the process begins by capturing and processing camera data to detect gestures, as discussed above with respect to FIG. 5. In step 602, a determination may be made as to whether a start command has been detected. A start command may be any desired input (e.g., gesture, keyboard, etc.) signaling the application that the combined touch/non-touch gesture inputs are about to begin. For example, the sand program discussed above may define a start command as a waving of the hand over the screen 201, or by pressing a key on a keyboard input 106, or any other desired input. In some embodiments, the start command may be configured to only use one type of input (e.g., touch, non-touch, keyboard, etc.), to minimize risk of ambiguity in gesture detection. If no start command has been detected, the process may return to step 601. Note that even if no start command has been detected, a detected gesture may still have meaning to a different application running in parallel (other than the one following the example FIG. 6 process).

If a start command has been detected, then in step 603, the system may perform the process from FIG. 5 to determine whether a gesture has been detected from camera 203's point of view. The camera 203 may be most suited for detecting touch gestures, but it may also attempt to detect non-touch gestures as well, as discussed above with respect to FIG. 5. As output, the system may generate a gesture identification and similarity value ($S_T$) from camera 203's point of view.

Then, in step 604, the system may perform the same (or similar) gesture detection process, but using the image from camera 204. That camera 204 may be most suited for detecting non-touch gestures occurring above the screen 201, but it may also attempt to detect touch gestures as well. As output, the system may generate a gesture identification and similarity value ($S_H$) from camera 204's point of view.

Then, in step 605, the determinations from these systems are considered together to resolve the gesture into a command. This combined consideration may be performed according to the more detailed example shown in FIG. 7, discussed below. After the gesture is detected, the system may determine, in step 606, whether the gesture has resulted in an end command. The end command, like the start command, may be another predetermined input (e.g., gesture and/or keyboard) that signals to the application that the user wishes to end the application.

If the end command has been detected, then the process may proceed to step 607, and the application operation may be finalized. The finalization may include any step needed to conclude the application, such as closing files opened by the application, releasing reserved memory resources, printing and/or saving a final image displayed on the screen 201, etc.

If the end command was not detected, then the process may proceed to step 608, and a command corresponding to the detected gesture may be executed. Various commands may each be assigned to one or more gestures, such as by storing a template file associating gestures with system/application commands. When a detected gesture corresponds to one of those commands, then the corresponding command may be executed in step 608. In step 608, if the detected gestures do not correspond to a command, then the system need not execute any command in step 608.

After executing any corresponding command in step 608, the process may return to step 603, to attempt to detect the next touch and non-touch gestures. This process may repeat continuously while the application is executing. Additionally, it is noted above that the detection of a gesture need not always result in a corresponding command being executed. In some situations, a detected gesture may simply be a part of a longer gesture required for a corresponding command. To use the sand example, the command for picking up sand may be mapped to a sequence of gestures, such as a hand press touch gesture, followed by a non-touch grasp gesture (or making a first). The system may detect the hand press touch gesture, and pass through steps 606 and 608, returning to 603 to detect the ensuing grasp gesture before executing the command for picking up the sand.

Figure 7:
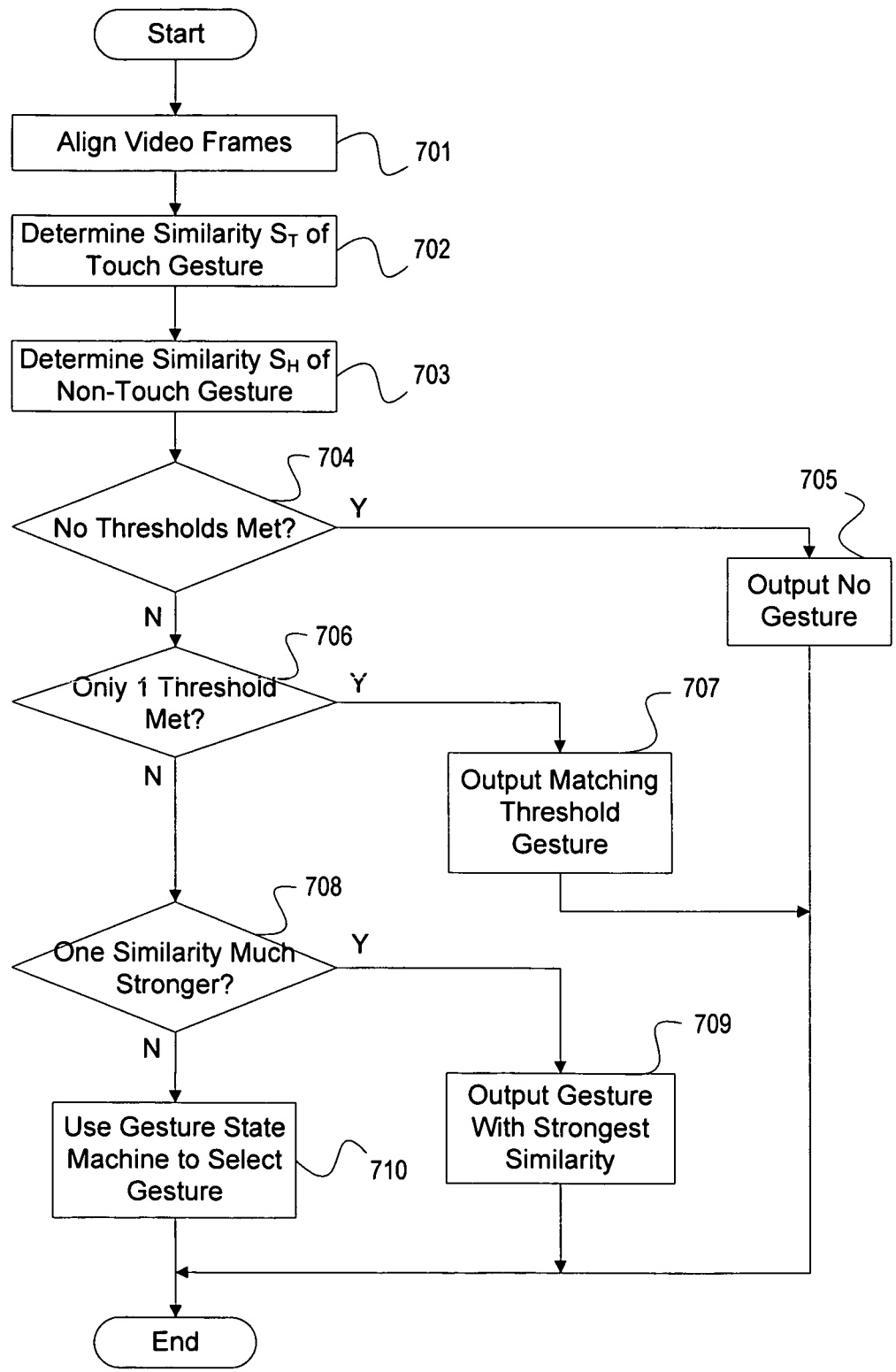
FIG. 7 illustrates an example process of detecting touch and non-touch gestures.

In the discussion of FIG. 6 above, the touch and non-touch gesture detections were considered together in step 605, resulting in a determination of a recognized touch and/or non-touch gesture. This "fusion" of touch and non-touch gesture detection can be achieved in a variety of ways, to allow both touch and non-touch gestures to be integrated into a user interface scheme for the system 100. FIG. 7 illustrates one example process for this fusion of step 605.

In step 701, the process may first align in time the video frames captured by cameras 203 and 204, so that the system compares the same scene from the two cameras. For example, the system may choose video frames taken by the cameras 203, 204 at time 12:01:00. Then, in step 702, the system may use the image from camera 203 to determine whether, from camera 203's point of view, a predetermined gesture has been detected. This may follow the detection process discussed above in FIG. 5. In doing so, the system may determine not only whether a predetermined gesture's template matches the image in the frame, but it may also determine a similarity value $S_T$ for the match, and may output (or store) the identification and the similarity value.

In step 703, the same gesture detection process may be performed using the image data from camera 204, resulting in a gesture identification and similarity value $S_H$ based on the camera 204 image.

In step 704, the touch and non-touch similarities ($S_T$, $S_H$) may be normalized to make comparison easier (e.g., by normalizing them to a standard scale, such as a percentage of a perfect match), and they may then be compared with gesture validation thresholds ($T_T$, $T_H$) that may be predetermined for the different cameras 203, 204. The thresholds may determine the minimum level of similarity that will be required for the system to accept the detected gesture as actually having occurred. The actual threshold values may be established through a calibration/training process. For example, the system may initially ask the user to perform one or more predetermined, known gestures (e.g., prompting the user to "please place both hands palm-side down on the display") to obtain a baseline measurement of a gesture, and then the thresholds may be set a given percentage (e.g., 10%) off, to allow a predetermined deviation in distance, size, etc. This calibration/training may also occur over a period of use, or continually. For example, the system may allow the user to provide feedback indicating whether a particular gesture was accurately detected, and the system may adjust its threshold data to increase (or decrease) the threshold value to accommodate the gesture.

For example, the system may require a 50% certainty for gestures detected from camera 203, and a 75% certainty for gestures detected from camera 204. If, in step 704, it is determined that neither of the similarities ($S_T$, $S_H$) exceeds its corresponding threshold ($T_T$, $T_H$) (e.g., $S_T<T_T$ and $S_H<T_H$), then the process may proceed to step 705, and indicate that no suitable touch/non-touch gesture was detected.

If, however, at least one of the thresholds was met, then the process may proceed to step 706, and determine whether only one of the thresholds was met. If only one was met (e.g., only $S_T>T_T$; or only $S_H>T_H$), then the process may proceed to step 707, in which the gesture identified from the camera whose threshold was met is output. For example, if only the similarity from camera 203 ($S_T$) exceeded its threshold ($S_T>T_T$), then the system may generate an output indicating that the gesture identified in step 702 has been detected. Conversely, if the similarity from camera 204 ($S_H$) was the only one to exceed its threshold ($T_H$), then the system may generate an output indicating that the gesture identified in step 703 has been detected.

If, in step 706, it is determined that both thresholds were met, then the process may proceed to step 708, to determine which camera should be believed. If the similarity value from one camera is much stronger than the similarity value from the other camera, then the gesture identification from the first camera is output. This may be implemented by calculating a difference between the similarities (e.g., $|S_T-S_H|$), and setting a differential threshold ($T_D$) to determine how much stronger one camera's similarity value must be. For example, if the difference in similarity exceeds the differential threshold ($|S_T-S_H|>T_D$), then in step 709 the gesture identification from the camera having the higher similarity value is output.

However, in step 708, if the similarity values from the two cameras 203, 204 are close to one another (e.g., difference less than SD), the system may proceed to step 710, and employ a gesture state machine algorithm for determining which gesture identification should control. The gesture state machine algorithm may use the context of the application to determine which gesture detection is to be used. For example, the context information may identify the previous detected gesture, and the determination may compare the identified gestures in step 710 with the previous detected gesture.

The previous gesture may have associated with it a predetermined prioritized list identifying the likelihood of a subsequent gesture. For example, a template for a sand grasping gesture may indicate that this gesture is more likely to be followed by a sand releasing gesture, and that it is less likely to be followed by a pressing gesture. The system can, in step 710, consult this context information and select the more likely gesture. Other contextual information may be used as well, such as the hand position (from position A, positions B and C are more likely than position D), gesture frequency (in event of a tie in step 710, choose the more common gesture of the two identified gestures), command set (an application may have a subset of commands that are more likely to be used), etc.

After the detected gesture is output, the process may then terminate (or return to step 606, if the FIG. 7 process is used to implement step 605).

Although examples of carrying out the features described herein have been described, there are numerous other variations, combinations and permutations of the above described devices and techniques may exist as desired. For example, process steps may be rearranged, combined, omitted, interrupted, etc.; variable values may be changed, etc. The various structures and systems described herein may also be subdivided, combined, or varied as desired. For example, the touch-based system and non-touch based system need not be wholly separate systems, and may instead share components, such as cameras, display screens, processor capacity, memory, computer code, etc. Components and process steps may also be omitted. For example, the display screen may, if desired, be replaced with a simple surface, such as a touch pad.

The above description and drawings are illustrative only. The features herein are not limited to the illustrated embodiments, and all embodiments of the invention need not necessarily achieve all of the advantages or purposes, or possess all characteristics, identified herein.

The invention claimed is:

1. A method comprising:
    receiving image data corresponding to a user's gesture;
    processing, by a computing device, the image data to generate a touch gesture similarity value that defines similarity of the user's gesture to one or more touch gestures and a non-touch gesture similarity value that defines similarity of the user's gesture to one or more non-touch gestures;
    processing the touch gesture similarity value and the non-touch gesture similarity value to identify the user's gesture, resulting in an identified gesture; and
    generating an output in response to the identified gesture.

2. The method of claim 1, wherein processing the touch gesture similarity value and the non-touch gesture similarity value includes:

comparing the touch gesture similarity value with a first threshold value; and comparing the non-touch similarity value with a second threshold value.

3. The method of claim 2, further comprising setting the first and second threshold values to different values based on gesture type.

4. The method of claim 1, wherein a first portion of the image data is received from a touch-based gesture detection system, and a second portion of the image data is received from a non-touch based gesture detection system.

5. The method of claim 4, wherein processing the image data includes using the first portion of the image data from the touch-based gesture detection system to detect a non-touch gesture.

6. The method of claim 1, further comprising determining a differential similarity value, and comparing the differential similarity value with a difference between the touch gesture similarity value and the non-touch gesture similarity value.

7. The method of claim 1, further comprising:

using contextual information to select between a touch and non-touch gesture when processing the touch gesture similarity value and the non-touch gesture similarity value.

8. The method of claim 7, wherein the contextual information includes information identifying a previously-identified gesture.

9. The method of claim 7, wherein the contextual information includes information identifying a command set of an application.

10. One or more computer-readable media, storing computer-executable instructions that, when executed, cause a computer to at least:

receive image data corresponding to a user's gesture;

process the image data to generate a touch gesture similarity value that defines similarity of the user's gesture to one or more touch gestures and a non-touch gesture similarity value that defines similarity of the user's gesture to one or more non-touch gestures;

process the touch gesture similarity value and the non-touch gesture similarity value to identify the user's gesture, resulting in an identified gesture; and generate an output in response of the identified gesture.

11. The one or more computer-readable media of claim 10, wherein processing the touch gesture similarity value and the non-touch gesture similarity value includes:

comparing the touch gesture similarity value with a first threshold value; and comparing the non-touch gesture similarity value with a second threshold value.

12. The one or more computer-readable media of claim 11, wherein the first and second threshold values differ based on different gesture types.

13. The one or more computer-readable media of claim 10, wherein a first portion of the image data is received from a touch-based gesture detection system, and a second portion of the image data is received from a non-touch based gesture detection system.

14. The one or more computer-readable media of claim 13, further storing computer-executable instructions that, when executed, cause the computer to: use the first portion of the image data from the touch-based gesture detection system to detect a non-touch gesture.

15. The one or more computer-readable media of claim 10, further storing computer-executable instructions that, when executed, cause the computer to compare a differential similarity value with a difference between the touch gesture similarity value and the non-touch gesture similarity value.

16. The one or more computer-readable media of claim 10, further storing computer-executable instructions that, when executed, cause the computer to:

use contextual information to select between a touch gesture and a non-touch gesture.

17. The one or more computer-readable media of claim 16, wherein the contextual information includes information identifying a previously-identified gesture.

18. The one or more computer-readable media of claim 16, wherein the contextual information includes information identifying a command set of an application.

19. An apparatus, comprising:

one or more processors; and memory storing computer-executable instructions that, with the processor, cause the apparatus to at least:

receive image data corresponding to a user's gesture;

process the image data to generate a touch gesture similarity value that defines similarity of the user's gesture to one or more touch gestures and a non-touch gesture similarity value that defines similarity of the user's gesture to one or more non-touch gestures;

process the touch gesture similarity value and the non-touch gesture similarity value to identify the user's gesture, resulting in an identified gesture; and generate an output in response to the identified gesture.

20. The apparatus of claim 19, wherein processing the touch gesture similarity value and the non-touch gesture similarity value includes:

comparing the touch gesture similarity value with a first threshold value; and comparing the non-touch similarity value with a second threshold value.

21. The apparatus of claim 20, wherein the first and second threshold values differ based on different gesture types.

22. The apparatus of claim 19, wherein a first portion of the image data is received from a touch-based gesture detection system, and a second portion of the image data is received from a non-touch based gesture detection system.

23. The apparatus of claim 19, wherein the memory further stores computer-executable instructions that, with the processor, cause the apparatus to use the first portion of the image data from a touch-based gesture detection system to detect a non-touch gesture.

24. The apparatus of claim 19, wherein the memory further stores computer-executable instructions that, with the processor, cause the apparatus to compare a differential similarity value with a difference between the touch gesture and non-touch gesture similarity values.

25. The apparatus of claim 19, wherein the memory further stores computer-executable instructions that, with the processor, cause the apparatus to use contextual information to select between a touch gesture and a non-touch gesture.

26. The apparatus of claim 25, wherein the contextual information includes information identifying a previously-identified gesture.

27. The apparatus of claim 25, wherein the contextual information includes information identifying a command set of an application.

28. The apparatus of claim 19, further comprising an infrared camera and a plurality of infrared light sources positioned below a screen, wherein the infrared camera is configured to supply at least a portion of the image data.

29. The apparatus of claim 19, further comprising a visible light camera positioned above a screen, wherein the visible light camera is configured to supply at least a portion of the image data.

* * * * *